United States Patent Office 2,934,568
Patented Apr. 26, 1960

2,934,568
DETERGENT REACTION PRODUCTS OF BRANCHED CHAIN ALIPHATIC ALCOHOLS AND ETHYLENE OXIDE

George E. Barker, New Castle Hundred, Del., assignor to Atlas Powder Company, Wilmington, Del., a corporation of Delaware No Drawing. Application February 6, 1950
Serial No. 142,720

4 Claims. (Cl. 260—615)

This invention is a continuation-in-part of my copending application Serial No. 84,755, filed March 31, 1949, now abandoned, and relates to a synthetic detergent, and more particularly to a non-ionic detergent of the polyoxyethylene ether type.

Certain of the polyoxyethylene compounds, such as the alkyl phenol derivatives and alkyl mercaptan derivatives are known to have detergent properties but the heretofore described polyoxyethylene ethers of aliphatic alcohols have not had sufficient activity for detergent use.

An object of the present invention is to provide a new group of polyoxyethylene aliphatic ethers which have valuable properties as surface active agents and detergents.

Other objects will become apparent in the course of the following description.

In accordance with the present invention it has been found that the polyoxyethylene ethers of highly branched chain saturated 11- to 15-carbon atom acyclic alcohols wherein the ethers contain an average of 10 to 20 oxyethylene groups per mol are excellent detergents and vastly superior to the known ethers of the normal aliphatic alcohols.

Suitable branched chain alcohols are readily produced by conventional reactions resulting in the addition of one atom of hydrogen and a carbinol group to a lower olefinic polymer of isobutylene, or propylene, or to a lower mixed polymer of isobutylene and propylene where the number of carbon atoms in the polymer is from 10 to 14. The branched chain alcohols so produced contain one carbon atom more than the polymeric olefin making a total of from 11 to 15 carbon atoms. The said lower polymerized olefins are usually complex mixtures, some of which have not been completely resolved into their component compounds. It is known, however, that compounds containing a plurality of short alkyl side chains predominate in such polymers and it is this structure which characterizes the ether-alcohols of the present invention. In this connection it is pointed out in "Organic Chemistry" by Whitmore, D. Van Nostrand, Inc. (1937), at pp. 42-43, that the structures of triisobutylenes have been established as follows: 2,2,4,6,6-$Me_5$-heptene-3; 2,4,4,6,6-$Me_5$-heptene-2; 2,4,4,6-$Me_5$-heptene-1; and 2-neopentyl, 4,4-$Me_2$-pentene-1. These and other 10 to 14 carbon olefinic polymers whose structures are characteristic of the compounds of the present invention are illustrated by the following constitutional formulas:

10 carbon olefins—
$CH_3-CH(CH_3)-CH_2-$
$\qquad CH(CH_3)-CH_2-C(CH_3)=CH_2$
$CH_3-C(CH_3)_2-CH_2-CH_2-CH=C(CH_3)-CH_3$ 11 carbon olefins—
$CH_3-C(CH_3)_2-CH_2-C(CH_3)_2-CH=CH-CH_3$
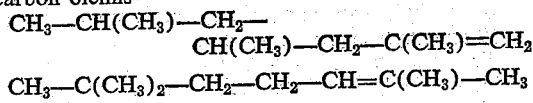
$CH_3-CH(CH_3)-CH_2-C[CH_2-C(CH_3)_3]=CH_2$ 12 carbon olefins—
$CH_3-C(CH_3)_2-CH_2-$
$\qquad C(CH_3)=CH-C(CH_3)_2-CH_3$
$CH_3-C(CH_3)_2-CH_2-C(CH_3)_2-$
$\qquad CH_2-C(CH_3)=CH_2$
$CH_3-C(CH_3)_2-CH_2-C(CH_3)_2-$
$\qquad CH=C(CH_3)-CH_3$
$CH_3-C(CH_3)_2-CH_2-C[CH_2-C(CH_3)_3]=CH_2$
$CH_3-CH(CH_3)-CH_2-CH(CH_3)-CH_2-$
$\qquad CH(CH_3)-CH=CH-CH_3$ 13 carbon olefins—
$CH_3-CH(CH_3)-CH_2-CH(CH_3)-CH_2-$
$\qquad CH(CH_3)-CH_2-C(CH_3)=CH_2$
$CH_3-CH(CH_3)-CH_2-CH(CH_3)-CH=$
$\qquad CH-CH_2-C(CH_3)_2-CH_3$ 14 carbon olefins—
$CH_3-CH(CH_3)-CH_2-CH(CH_3)-CH_2-$
$\qquad CH=CH-C(CH_3)_2-CH_3$
$CH_3-C(CH_3)_2-CH_2-C(CH_3)_2-CH=$
$\qquad CH-CH_2-CH(CH_3)-CH_3$
$CH_3-CH(CH_3)-CH_2-CH(CH_3)-CH_2-$
$\qquad C[CH_2-C(CH_3)_3]=CH_2$ Any of the above listed olefins and the many other $C_{10}$ to $C_{14}$ olefin hydrocarbons which can be formed by the polymerization of propylene and/or isobutylene may be converted to the saturated alcohol containing one more carbon atom than the olefin by any suitable method. For example, the hydrogen bromide addition product of the olefin may be converted to the corresponding Grignard reagent by the reaction with metallic magnesium in the well known manner. Reaction between the Grignard reagent so formed and formaldehyde, followed by acid hydrolysis results in the formation of the desired alcohols. This series of reactions is illustrated in the following sequence of equations:

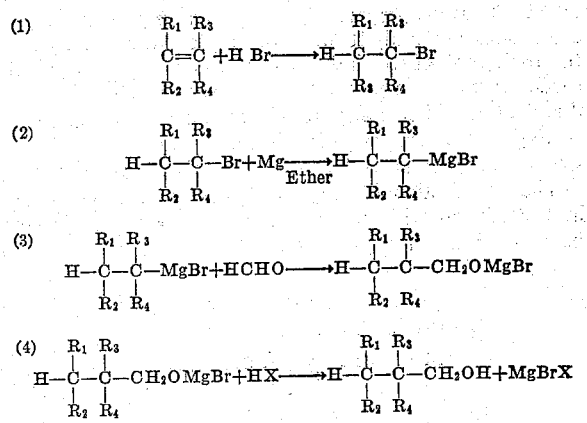

In the above equations $R_1$, $R_2$, $R_3$, and $R_4$ may be hydrogen or branched chain alkyl groups to complete the structure of any olefin of the type exemplified hereinbefore. X is any acid radical.

A commercially more acceptable method for producing the highly branched chain alcohols suitable for preparing the compounds of my invention is that process popularly known as the "Oxo" process, which comprises the reaction of carbon monoxide and hydrogen with an olefin to form an aldehyde having one carbon more than the olefin, and subsequently reducing the aldehyde to the corresponding alcohol. The reactions involved may be summarized in the following equations:

(1) 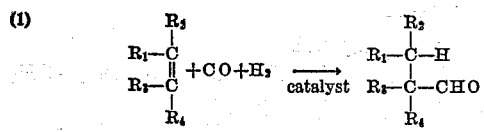

(2) 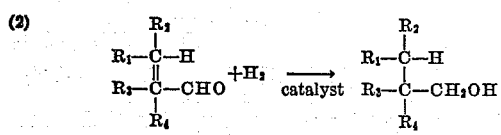

Application of the Oxo process to $C_{10}$ to $C_{14}$ olefins obtained by polymerizing propylene or isobutylene, or mixtures of the two yields alcohols with two or more short alkyl side chains, which are particularly well suited for conversion into the polyoxyethylene ethers of the present invention. Preferred alcohols are tridecyl alcohols having the molecular configuration of an alcohol produced by the Oxo process from tri-isobutylene and/or tetrapropylene. The method by which the alcohol is prepared from the olefin is not part of the present invention and the properties of the polyoxyethylene ether are the same whether the alcohol is made as described or by another method. In the claims the alcohols will be described as saturated highly branched chain 11 to 15 carbon atom alcohols characterized by the presence of the hydrocarbon structure of $C_{10}$ to $C_{14}$ olefinic polymers of olefins selected from the group consisting of propylene, isobutylene and mixtures of propylene and isobutylene.

The polyoxyethylene ethers of this invention are prepared from the highly branched chain alcohols hereinbefore described by direct reaction with ethylene oxide under conditions of elevated temperature and pressure. The reaction follows the usual course of reactions of ethylene oxide and aliphatic alcohols. Further information on this general reaction is to be found, for example, in U.S. Patent No. 1,970,578 to Schoeller and Wittwer. The reaction is quantitative and the molecular proportions of ethylene oxide and the alcohol employed determine the average chain length of the polyoxyethylene ether. Thus, to prepare an ether containing 10 oxyethylene groups per mol, 10 mols of ethylene oxide are used for each mol of alcohol. The product of the ethylene oxide reaction is a mixture of polyoxyethylene ethers of the alcohol which differ from each other in the number of oxyethylene groups per mol, the average number however being the same as the molecular ratio of the reactants.

The constitutional formulas of typical ether-alcohols in accordance with the above definition are indicated below for illustrative purposes.

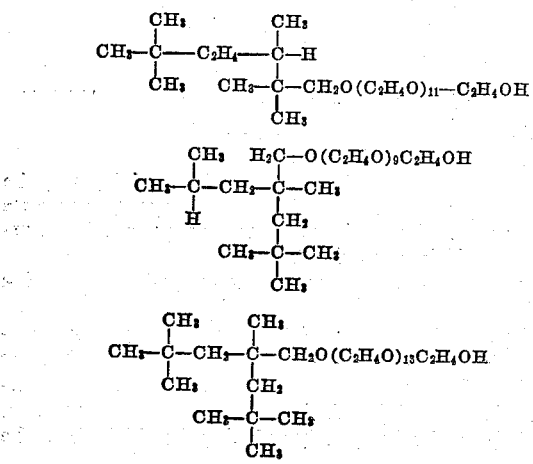

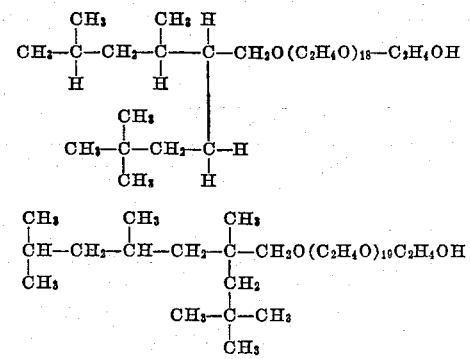

Within the class of ether-alcohols described and exemplified hereinbefore the preferred members are polyoxyethylene ethers of branched chain tridecyl alcohols which have from 12 to 14 oxyethylene groups per mol. Either single members of the group of ethers described or mixtures of two or more members of that group can be used.

The surface activity of the products of this invention is illustrated by the following test:

WETTING TIMES BY THE DRAVES TEST

| Detergent | Concentration, percent | Wetting Time (secs.) |
| --- | --- | --- |
| Polyoxyethylene tridecyl alcohol averaging 14 oxyethylene groups per molecule. The tridecyl alcohol used was prepared from tetra-propylene by the "Oxo" process | 0.1 | 15.1 |
| Polyoxyethylene lauryl alcohol, averaging 14 oxyethylene groups per molecule | 0.1 | 75.0 |

It will be noted that the branched chain alcohol derivative gave a wetting time ⅕ that of the lauryl derivative. The lauryl ether was selected as representative of the activity of the normal alcohol ethers.

The following table gives the conditions and observed results in launderometer tests on woolen cloth employing a standard soil and uniform washing cycle.

COMPARATIVE DETERGENCY

| Temp. (° F.) | Water Hardness (p.p.m.) | Detergent Concentration (percent) | Soil Removal (percent) | |
| --- | --- | --- | --- | --- |
| | | | Polyoxyethylene tridecyl alcohol (14 oxyethylene groups per molecule) | Polyoxyethylene lauryl alcohol (14 oxyethylene groups per molecule) |
| 100 | 50 | 0.03 | 18.7 | 13.9 |
| 100 | 50 | 0.05 | 21.4 | 14.0 |
| 100 | 50 | 0.25 | 19.6 | 18.8 |
| 100 | 300 | 0.03 | 18.6 | 17.7 |
| 100 | 300 | 0.05 | 19.1 | 15.9 |
| 100 | 300 | 0.25 | 18.1 | 14.9 |

Detergent compositions based on the polyoxyethylene ethers of the branched chain alcohols can also contain alkaline builders such as the usual alkali metal carbonates, phosphates, borates and silicates, suspending agents such as sodium carboxymethyl-cellulose, extending agents such as neutral salts like sodium sulfate or chloride. By way of example, the following detergent composition formulas are shown:

*Example I*

Percent
Polyoxyethylene ether of tridecyl alcohol containing
12 oxyethylene groups per mol _____ 12
Sodium carboxymethyl cellulose _____ 2
Sodium tripolyphosphate _____ 30
Sodium metasilicate _____ 10
Sodium carbonate _____ 46

The said ether is prepared from a tridecyl alcohol obtained by the "Oxo" process from tri-isobutylene.

Example II

| | Percent |
|---|---|
| Polyoxyethylene ether of tetradecyl alcohol containing 16 oxyethylene groups per mol | 15 |
| Tetrasodium pyrophosphate | 35 |
| Sodium sesquicarbonate | 40 |
| Water | 10 |

The ether is prepared from a tetradecyl alcohol obtained by the "Oxo" process from the thirteen carbon branched chain olefin comprising the condensation product of 3 molar proportions of propylene with one molar proportion of isobutylene. The said ether and water of the composition are mixed and thoroughly incorporated in the mixed solid ingredients.

Example III

| | Percent |
|---|---|
| Polyoxyethylene ether of pentadecyl alcohol containing 14 oxyethylene groups per mol | 15 |
| Sodium carboxyl-methyl cellulose | 3 |
| Tetrasodium pyrophosphate | 20 |
| Sodium orthosilicate | 30 |
| Soda ash | 32 |

The ether is prepared from a pentadecyl alcohol obtained by the "Oxo" process from a 14 carbon branched chain olefin produced by polymerizing approximately equimolar quantities of propylene and isobutylene.

The polyoxyethylene ethers can be solidified by admixture with urea in accordance with the disclosure of my co-pending application, Serial No. 4,082, filed January 23, 1948, now U.S. Patent 2,665,256, issued January 5, 1954. Compounded detergent powders can be made in non-bleeding form by the addition of urea and any of the usual solid builders or extenders to the polyoxyethylene ethers.

The ethers of the invention are water soluble and stable to alkali and may be used in the preparation of aqueous liquid detergents which can contain alkaline builders and other soluble materials.

I claim:
1. A polyoxyethylene ether of a highly branched chain tridecyl alcohol having the molecular configuration of an alcohol produced by the Oxo process from tetrapropylene, said ether containing from 10 to 20 oxyethylene groups per mol.
2. A polyoxyethylene ether of a tridecyl alcohol characterized by the presence of the hydrocarbon structure of a tetrapropylene, said ether containing an average of about 14 oxyethylene groups per mol.
3. A polyoxyethylene ether of a highly branched chain tridecyl alcohol having the molecular configuration of an alcohol produced by the Oxo process from tetrapropylene, said ether containing from 10 to 12 oxyethylene groups per mol.
4. The condensation products of 10–12 mols of ethylene oxide with a highly branched monohydric primary alcohol having the molecular configuration of an alcohol produced by the Oxo process from tetrapropylene.

References Cited in the file of this patent

UNITED STATES PATENTS

| | | |
|---|---|---|
| 1,970,578 | Schoeller et al. | Aug. 21, 1934 |
| 2,174,761 | Schuette et al. | Oct. 3, 1939 |
| 2,226,119 | De Groote et al. | Dec. 24, 1940 |
| 2,327,053 | Marple et al. | Aug. 17, 1943 |
| 2,335,194 | Nuesslein et al. | Nov. 23, 1943 |
| 2,508,035 | Kosmin | May 16, 1950 |
| 2,508,036 | Kosmin | May 16, 1950 |

FOREIGN PATENTS

| | | |
|---|---|---|
| 879,689 | France | Nov. 30, 1942 |